US012598534B2

(12) United States Patent (10) Patent No.: US 12,598,534 B2
Redmond et al. (45) Date of Patent: Apr. 7, 2026

(54) PATH STUDY AND ANTENNA LOCATING SYSTEMS AND METHODS

(71) Applicant: Schneider Electric Systems USA, Inc., Foxborough, MA (US)

(72) Inventors: James Redmond, Richmond (CA); Zackery Sobin, Raleigh, NC (US)

(73) Assignee: Schneider Electric Systems USA, Inc., Foxborough, MA (US)

( * ) Notice: Subject to any disclaimer, the term of this patent is extended or adjusted under 35 U.S.C. 154(b) by 461 days.

(21) Appl. No.: 18/129,423

(22) Filed: Mar. 31, 2023

(65) Prior Publication Data

US 2024/0334299 A1 Oct. 3, 2024

(51) Int. Cl.
| | |
|---|---|
| *H04W 40/18* | (2009.01) |
| *G06N 20/00* | (2019.01) |
| *H04L 41/147* | (2022.01) |
| *H04L 41/16* | (2022.01) |
| *H04L 67/12* | (2022.01) |
| *H04W 16/18* | (2009.01) |
| *H04W 40/12* | (2009.01) |

(52) U.S. Cl.
CPC ............ *H04W 40/18* (2013.01); *G06N 20/00* (2019.01); *H04L 41/147* (2013.01); *H04W 40/12* (2013.01); *H04L 41/16* (2013.01); *H04L 67/12* (2013.01); *H04W 16/18* (2013.01)

(58) Field of Classification Search
CPC ..... H04W 40/18; H04W 40/12; H04W 16/18; G06N 20/00; H04L 41/147; H04L 41/16; H04L 67/12; G05B 2219/24215; G05B 2219/2421
See application file for complete search history.

(56) References Cited

U.S. PATENT DOCUMENTS

| | | | | |
|---|---|---|---|---|
| 2012/0057489 A1* | 3/2012 | Shiotsuki | .............. | H04W 40/12 |
| | | | | 370/252 |
| 2013/0003645 A1* | 1/2013 | Shapira | .............. | H04B 7/15507 |
| | | | | 370/315 |

(Continued)

FOREIGN PATENT DOCUMENTS

WO 2014063525 A1 5/2014

OTHER PUBLICATIONS

ScienceDirect, Large scale survey for radio propagation in developing machine learning model for path losses in communication systems, Scientific African, vol. 19, Mar. 2023, Total 59 Pages. (Year: 2023).*

(Continued)

*Primary Examiner* — Brian J. Gillis
*Assistant Examiner* — Chhian (Amy) Ling
(74) *Attorney, Agent, or Firm* — Stinson LLP

(57) ABSTRACT

Method and system for automating a path study to establish a private network between an access point and a remote asset along an optimal path. A predictive model identifies potential communications paths between the access point and the remote asset based on site data. The potential communications paths each specifies at least one antenna parameter. The machine learning also includes selecting the optimal path from the potential communications paths based at least in part on the network performance requirements of the private network and predicted signal quality along the potential communications paths using the antenna parameter.

22 Claims, 7 Drawing Sheets

(56)             References Cited

U.S. PATENT DOCUMENTS

| | | | |
|---|---|---|---|
| 2018/0054742 A1* | 2/2018 | Kahtava | H04B 7/2606 |
| 2019/0313363 A1* | 10/2019 | Pan | H04W 40/02 |
| 2022/0124548 A1 | 4/2022 | Srivastava et al. | |
| 2022/0321467 A1 | 10/2022 | Szigeti et al. | |
| 2022/0357419 A1* | 11/2022 | Givehchian | G01S 13/878 |

OTHER PUBLICATIONS

Extended European Search Report from EP Application No. 24162501.
1, dated Aug. 29, 2024, 4 pages.
Response to Extended European Search Report from EP Application
No. 24162501.1, filed Mar. 14, 2025, 17 pages.

* cited by examiner

PATH STUDY AND ANTENNA LOCATING SYSTEMS AND METHODS

BACKGROUND

In a typical industrial automation system, a Supervisory Control and Data Acquisition (SCADA) system communicates with many industrial assets, including smart devices such as remote terminal units and programmable logic controllers. These devices provide remote industrial or resource monitoring and control and are configured for use in a particular application (e.g., oil and gas, water and waste water, renewable energy). The SCADA system typically communicates with remote devices via a private data radio network and/or a cellular telephone network. For example, the private data radio network includes a data radio (also referred to as a remote wireless terminal) coupled to the SCADA system. This data radio acts as a base station, or access point, and other data radios coupled to the remote devices transmit telemetry data to the SCADA system and receive messages back for controlling their operations. In a typical installation, the access point handles communications with hundreds of remote data radios.

Path studies are used to help design reliable paths for communicating with remote substations of the industrial automation system. A typical path study, which is performed by a human operator, attempts to optimize the location, height, type, and gain of antennas as well as the number and placement of repeater systems. Unfortunately, the typical path study often relies on outdated and/or incomplete site information. Improvements in performing effective and efficient path studies are needed.

SUMMARY

Aspects of the present disclosure permit a data radio, cell modem, or other suitable network edge device to perform its own path study. Alternatively, a web service associated with the device performs the path study. In addition, aspects of the present disclosure allow for the antenna site to be quickly adjusted based on new information, such as an in-person site survey. The automated path study eliminates the need for a person to perform the manual task and allows greater flexibility and ease of assessing options by considering the tradeoffs of different antenna locations and designs.

In an aspect, a method manages remote telemetry communications in a process control system. The process control system comprises a SCADA server configured to monitor telemetry data from a remote industrial asset and provide supervisory control via a private network. The private network comprises a plurality of data radios. The method comprises receiving input representative of network performance requirements for the private network and retrieving site data from a site database in response to a request to perform a path study. The site data stored in the site database comprises information relating to a designated area for establishing remote telemetry communications via the private network. The data radios include a data radio associated with the remote industrial asset and an access point associated with the SCADA server. The method further includes executing machine learning to perform the path study for establishing the private network between the access point and the data radio associated with the remote industrial asset within the designated area. The machine learning includes executing a predictive model based on the retrieved site data to identify potential communications paths between the access point and the data radio associated with the remote industrial asset. The potential communications paths each specifies at least one antenna parameter. The machine learning also includes selecting an optimal communication path from the potential communications paths based at least in part on the network performance requirements of the private network and predicted signal quality along the potential communications paths and establishing remote telemetry communications via the private network between the access point and the data radio associated with the remote industrial asset within the designated area along the optimal communication path.

In another aspect, an automation system comprises a private network having a plurality of data radios and a remote industrial asset coupled to the private network. The system also includes a SCADA server configured to monitor telemetry data from the remote industrial asset and provide supervisory control via the private network. The data radios include a data radio associated with the remote industrial asset and an access point associated with the SCADA server. A site database of the system stores information relating to a designated area for establishing remote telemetry communications via the private network. The system also includes a path study processor coupled to the site database and a memory device. The path study processor receives input representative of network performance requirements for the private network and retrieves site data from the site database in response to a request to perform a path study. The memory device stores computer-executable instructions that, when executed by the path study processor, configure the path study processor for executing machine learning to perform the path study for establishing the private network between the access point and the data radio associated with the remote industrial asset within the designated area. The machine learning includes executing a predictive model based on the retrieved site data to identify potential communications paths between the access point and the data radio associated with the remote industrial asset. The potential communications paths each specifies at least one antenna parameter. The machine learning also includes selecting an optimal communication path from the potential communications paths based at least in part on the network performance requirements of the private network and predicted signal quality along the potential communications paths and establishing remote telemetry communications via the private network between the access point and the data radio associated with the remote industrial asset within the designated area along the optimal communication path.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
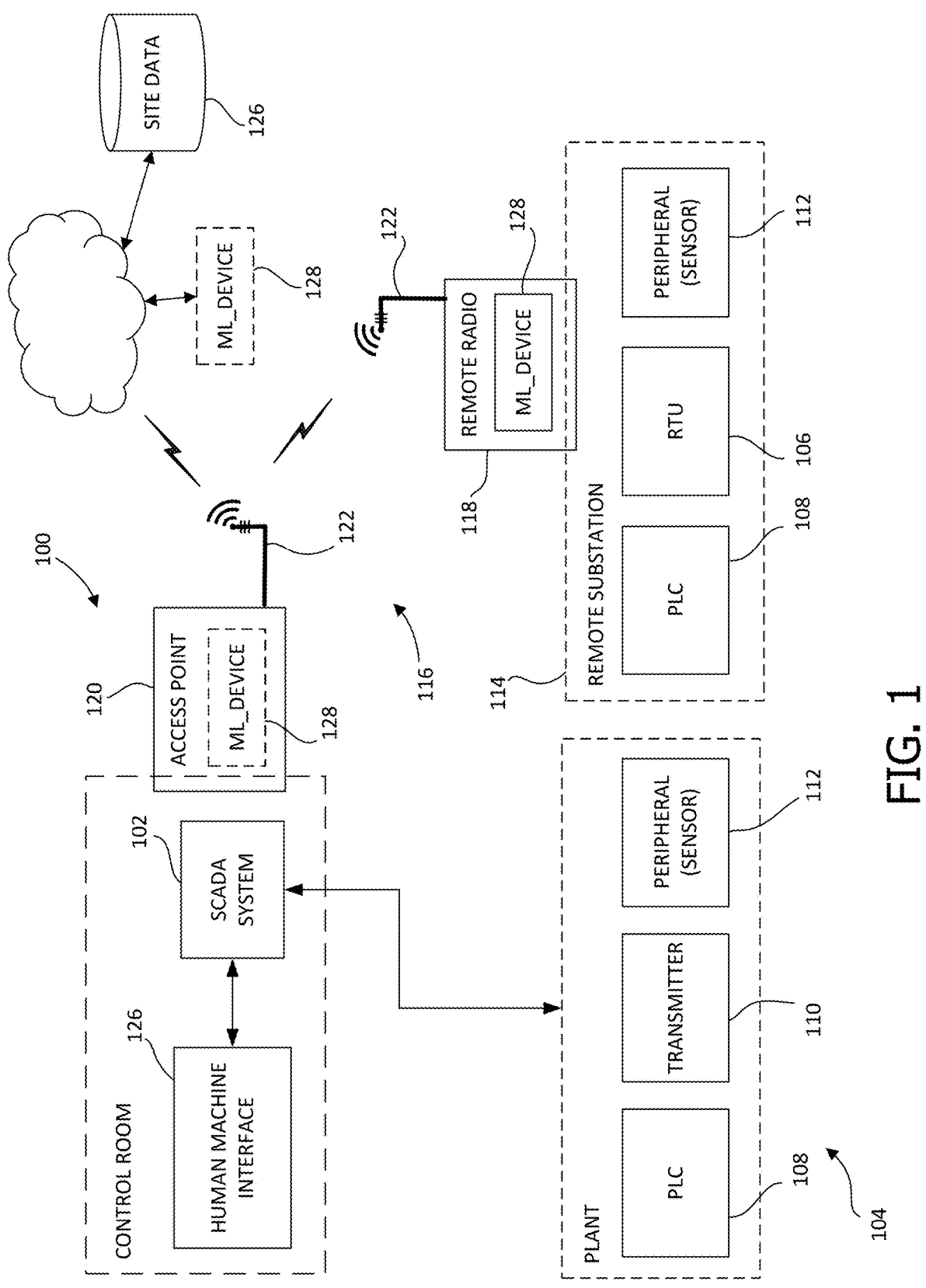
FIG. 1 illustrates an automation system according to an embodiment.
Figure 2:
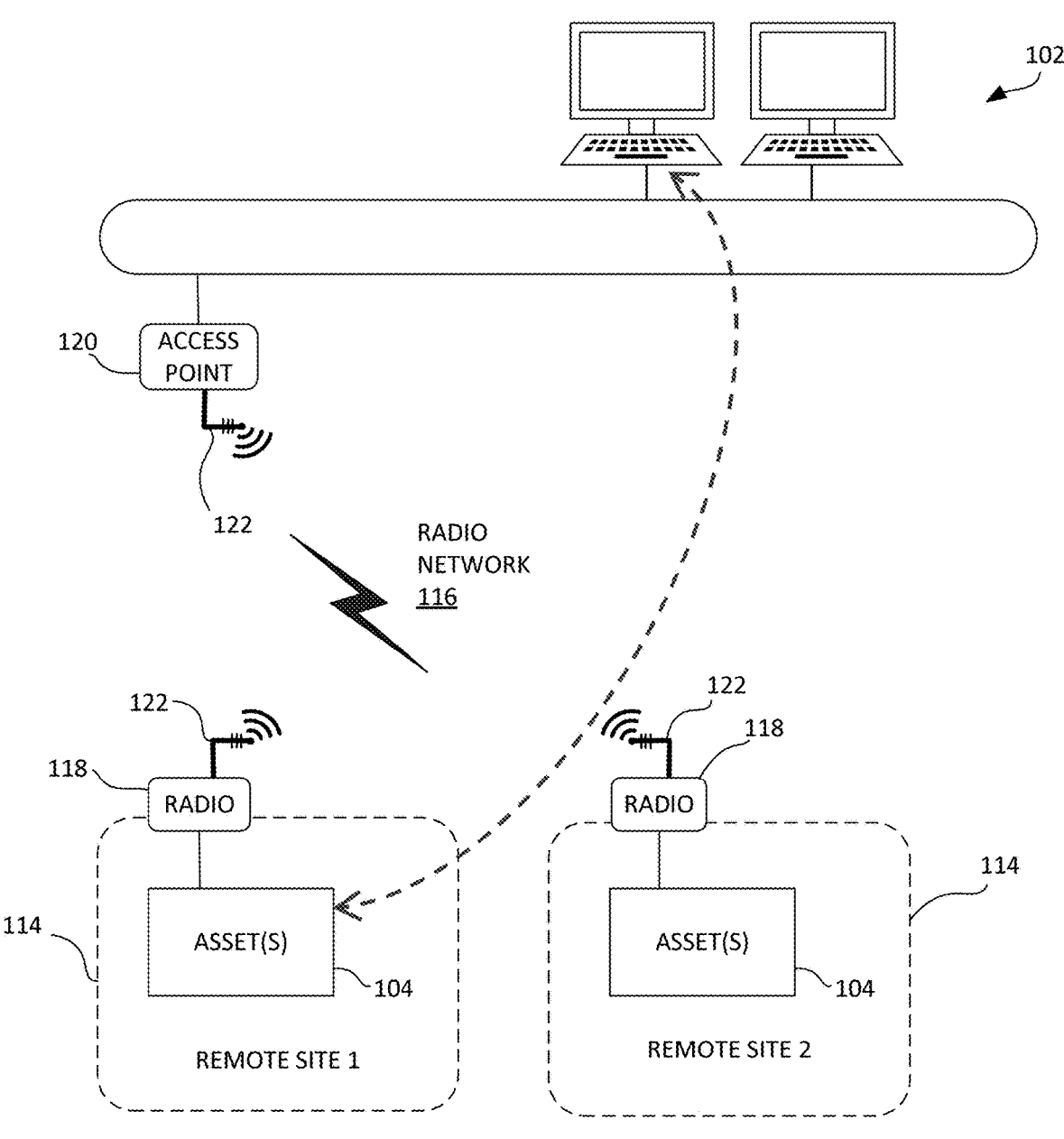
FIG. 2 illustrates an automation system according to another embodiment.

Referring to FIG. 1, a schematic overview of an automation system according to one embodiment is generally indicated 100. FIG. 2 is a block diagram of the system 100 according to another embodiment. The automation system 100 includes a Supervisory Control and Data Acquisition (SCADA) system 102 communicating with one or more industrial assets, generally indicated 104. In the illustrated embodiment, the industrial assets 104 include one or more industrial control and monitoring devices, such as a remote terminal unit (RTU) 106, a programmable logic controller (PLC) 108, a multivariable transmitter (MVT) 110, and a peripheral 112 (e.g., sensor, actuator, variable frequency drive, motor controller, pressure transmitter, Coriolis meter, magnetic flow meter, cell modem, etc.). In another embodiment, asset 104 comprises a computing device, edge computer, or similar edge device.

The SCADA system 102 of FIG. 1 is coupled to a remote substation 114 via a communications network 116, such as a private data radio network and/or a cellular telephone network. In the illustrated embodiment, the remote substation 114 and the SCADA system 102 communicate with each other via the private data radio network 116, which includes a plurality of remote radios 118 associated with one or more remote substations 114 and a base station, or access point, 120 associated with SCADA system 102. The data radios 118 and the access point 120 each have an associated antenna 122 for communicating on the network 116. The substation 114 typically includes a number of peripherals 112 and at least one RTU 106 for data acquisition from substation 114 and/or from SCADA system 102. The RTU 106 transmits telemetry data to SCADA system 102 and receives messages from SCADA system 102 for controlling connected physical objects of remote substation 114. Suitable data radios for use as remote radio 118 and/or access point 120 are Trio licensed Ethernet and serial data radios available from Schneider Electric. These licensed UHF data radios provide serial and Ethernet connectivity for long range wireless data communications in a wide range of SCADA and telemetry applications.

In addition to the RTU 106, peripherals 112, and other components of remote substation 114, the SCADA system 102 in the illustrated embodiment communicates with at least one PLC 108. In a SCADA-based control system, PLC 108 is connected to, for example, a sensor (i.e., peripheral 112) for collecting the sensor output signals and converting the signals into digital data. The SCADA system 102 may also communicate with a multi-variable transmitter, such as MVT 110, which is used to measure flow, differential pressure, temperature, pressure, or the like. The various assets 104, including RTU 106, PLC 108, MVT 110, and/or peripheral 112, communicate with SCADA system 102 according to different protocols (e.g., DNP3, Modbus, IEC-104). The automation system 100, including data radios 118, may be an electrical grid automation system, a water grid network monitoring system, or the like.

As described above, industrial automation systems, such as system 100, typically include many industrial assets 104 executing many applications. When the description herein refers to an example in which the industrial asset 104 comprises RTU 106, it is to be understood that aspects of the present disclosure may also be implemented in other assets 104 of SCADA system 102.

As shown in FIG. 1, SCADA system 102 operates in conjunction with a human-machine interface (HMI) 126. The HMI 126 is an input-output device that presents process information to a human operator. The SCADA system 102 links to HMI 126 for providing maintenance procedures, detailed schematics, logistic information, trend data, diagnostic data, configuration data transfer, and the like for a specific sensor or machine. In an embodiment, HMI 126 comprises a personal computer, smartphone, tablet, touch-screen HMI device, or the like. Although illustrated in a control room remotely from the various industrial assets 104, it is to be understood that HMI 126 could be hosted on the device itself.

Figure 3:
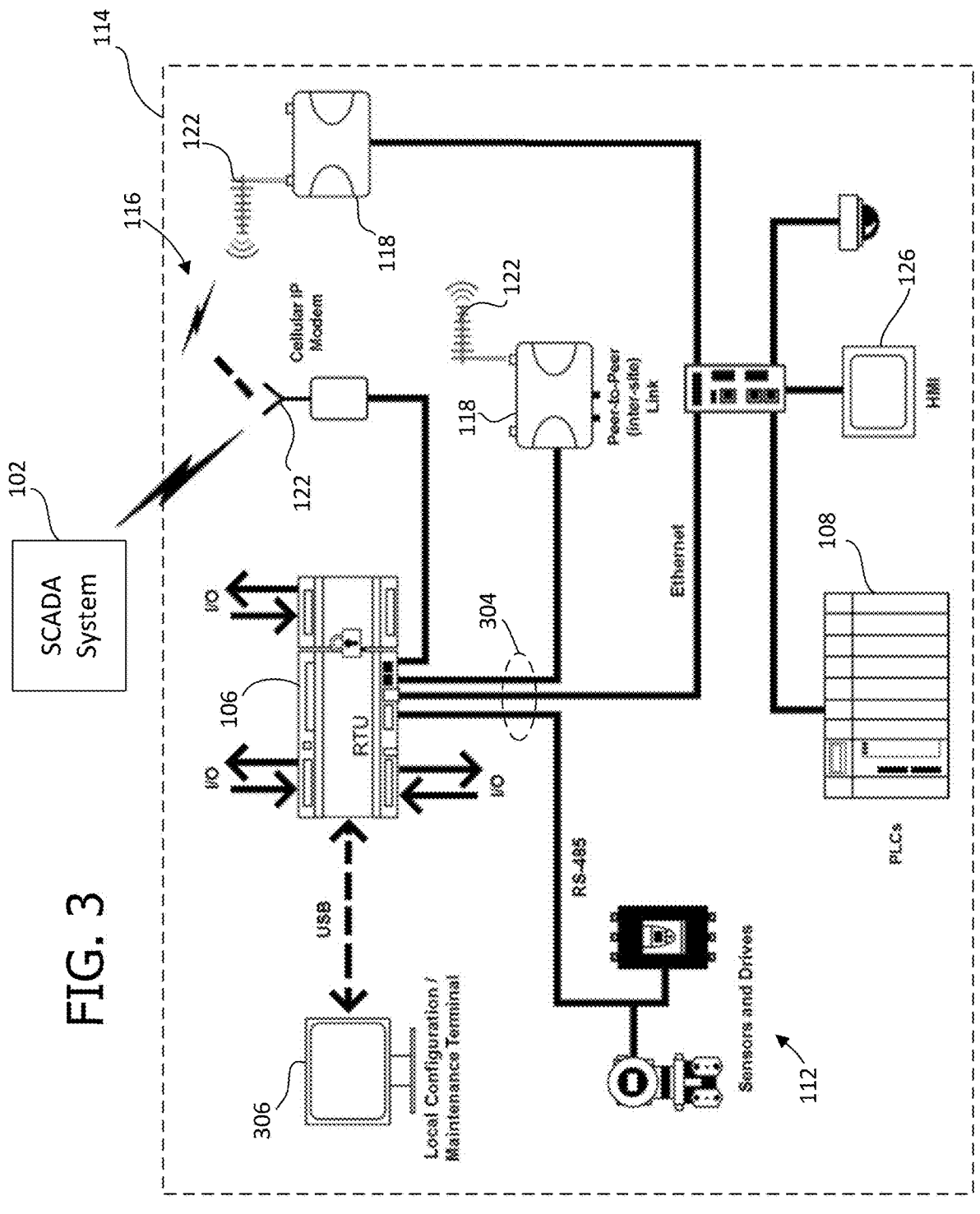
FIG. 3 is a block diagram of a remote substation including a remote terminal unit (RTU) of FIG. 1.

In an embodiment, the RTU 106 is used as a control device as shown in FIG. 3. A communication bus 304 provides communication for the complete substation 114 and all parts of the substation are accordingly connected thereto, whether directly or indirectly. The RTU 106 is configured to be connected to a computer 306 (e.g., a personal computer, desktop, laptop, workstation machine, etc.) of SCADA system 102 to access and control settings and parameters as well as a real-time database.

Referring again to FIG. 1, an edge PC (e.g., computer 306) or other edge device (e.g., data radio 118, access point 120, RTU 106, PLC 108) is configured to execute a path study application embodying aspects of the present disclosure. The path study accesses information to determine optimal locations for radio and cell antennas 122 on a given site. The accessed information, indicated as site data stored in a database 126, may be maps, property boundary information, satellite imagery, Global Positioning System (GPS) data, topography data, on-site observations, and the like. It is to be understood that the edge device may be access point 120, data radio 118 (or a cell modem), RTU 106, PLC 108, or another asset 104. For the sake of convenience, however, the description below refers to an example in which data radio 118 comprises the edge device. In an alternative embodiment, the path study application is executed by computer 306 or hosted in the cloud or at an on-premise server.

Figure 7:
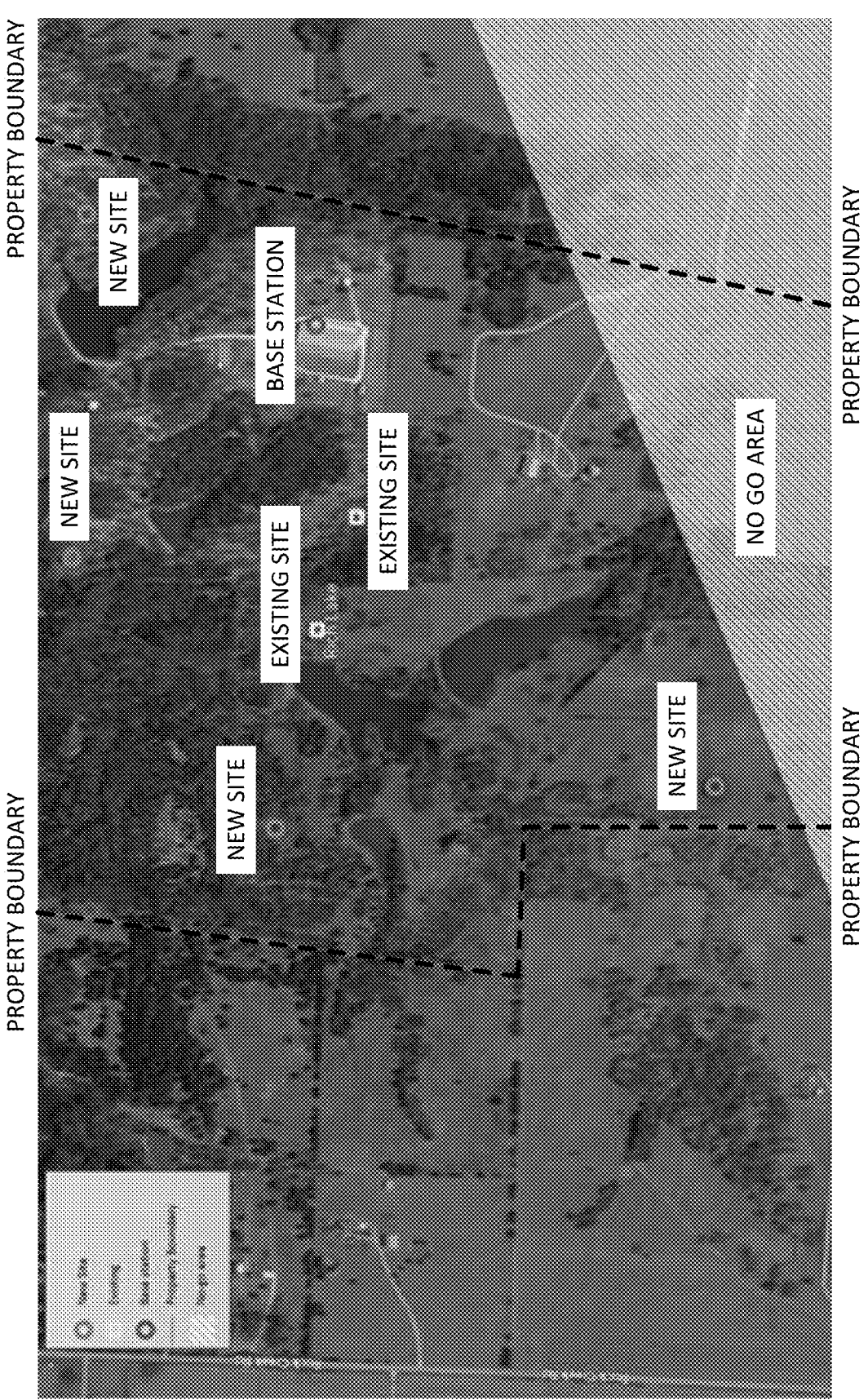
FIG. 7 illustrates an example site map resulting from the path study of FIG. 7.

Advantageously, the path study application provides the information required for optimizing communication paths to remote substations 114 of the industrial automation system 100 and indicates the communication needs. The path study application automatically calculates a series of paths using the resources provided via site data 126 and suggests one or more sites likely suitable for the location of the antennas 122. The path study application is also capable of suggesting information of concern (e.g., no-go, or prohibited, areas) for antennas 122. FIG. 7 provides an example of locating new sites relative to a base station and a no-go area. According to aspects of the present disclosure, the edge device employs machine learning (ML) to synthesize multiple sources of information stored in site data 126 about the application and location and process the information describing the location of the antennas for performing the path study. In an embodiment, data radio 118 comprises a processor coupled to a memory device storing computer-executable instructions, including reinforced machine learning algorithms. The processor and associated computer-executable instructions are indicated ML_Device 128 in FIG. 1. When executed, these instructions configure ML_Device 128 to perform the path study. In one example, a suitable edge device such as the data radio or cell modem comprises ML_Device 128 performing the path study and, in another example, an application or service hosted on the web or in the cloud or on a server comprises ML_Device 128 performing the path study.

Figure 4:
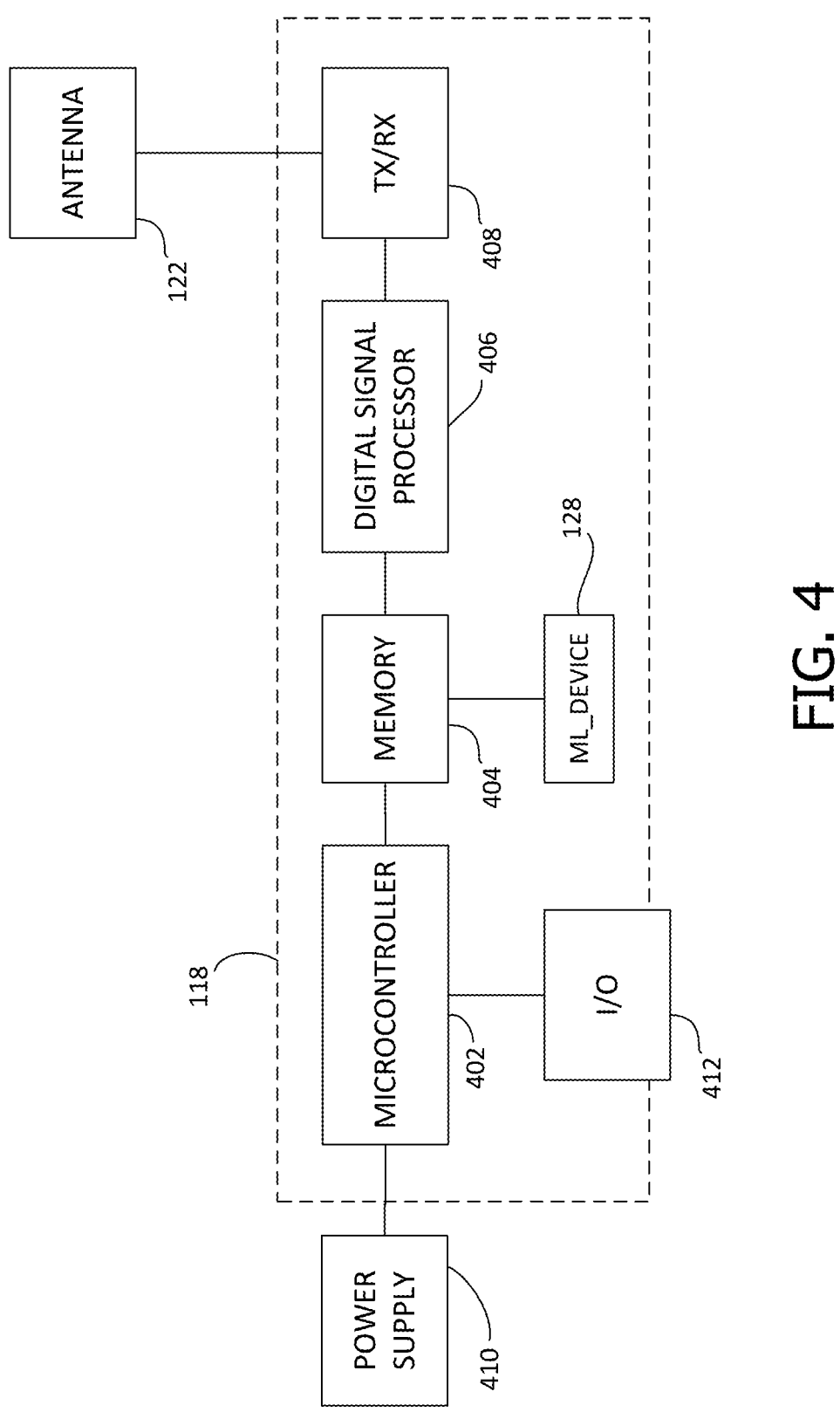
FIG. 4 is a block diagram of a data radio of FIG. 1.

FIG. 4 illustrates data radio 118, including its major components. As shown, the data radio 118 includes a microcontroller 402 or similar processing unit and a memory 404 (e.g., volatile and non-volatile). While ML_Device 128 is illustrated as a separate component, it is to be understood that ML_Device 128 could be embodied by the microcontroller 402 and memory 404. A digital signal processor 406 sends signals to and receives signals from transmitter and receiver circuitry 408, which is coupled to antenna 122. A power supply module 410 provides power to data radio 118. In an embodiment, data radio 118 includes an I/O (input/output) serial or serial and Ethernet interface 412. The data radio 118 is configured to be interfaced to multiple control stations and intelligent electronic devices using different communication media such as RS485, RS232, Ethernet, etc.

Figure 5:
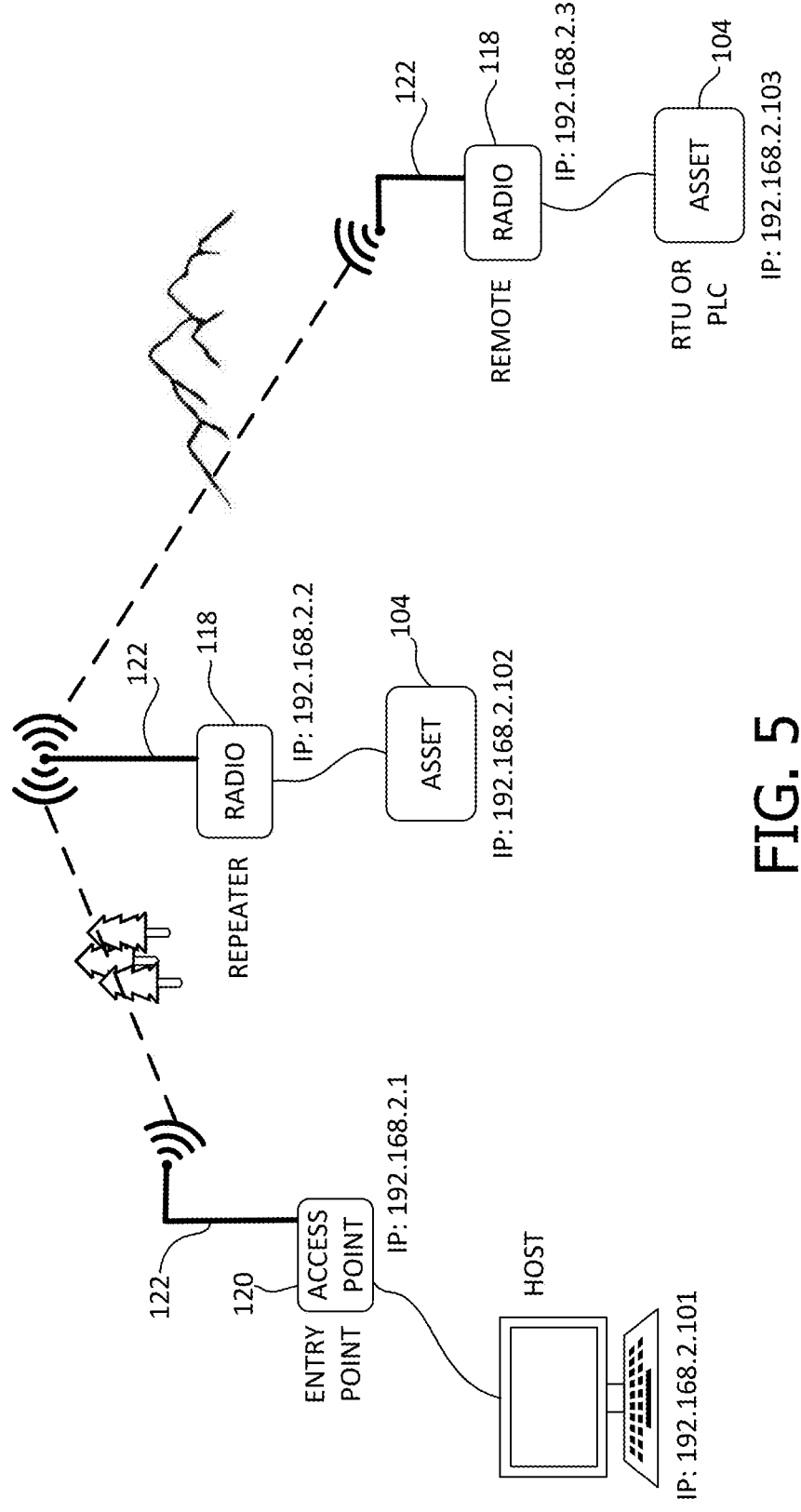
FIG. 5 illustrates an example communications path using data radios of FIG. 1.

The use of machine learning to combine multiple sources of information such as satellite photos, air photos, maps, GPS data on areas found unsuitable for a site survey, and the like stored in site data 126 allow the processing device ML_Device 128 to develop a sophisticated map-like data set to describe the location. The ML_Device 128 executes the machine learning process to produce multiple possible paths and employs user-entered criteria such as projected signal strength, distance from process, etc. to suggest optimal location(s) for positioning antenna(s) 122. FIG. 5 illustrates an example communications path using one of the data radio 118 as a repeater.

For training its predictive model, ML_Device 128 uses data from manual path studies. In an embodiment, the training begins by teaching the artificial intelligence (AI) to calculate signal quality at the base station, i.e., access point 120, following preset paths. At the next step, ML_Device 128 reviews problems to identify sites where a repeater is required as opposed to sites where no repeater is required. Once this has been done, the next step is to train the AI to determine the height of the antenna towers on a path. In an embodiment, a user-configurable mechanism factors in, for example, the cost of additional sites compared to different tower heights to allow the AI algorithm to balance costs of an additional repeater against excessive tower heights. Using this calculation, the lowest cost sites that meet the network performance requirements could then be used.

The next step would be to use a catalog of previous manual path studies to train the AI to find suitable paths. In an embodiment, this training begins with relatively simple problems involving one end node and includes problems where there is no suitable path to ensure that the algorithm indicates which sites are fundamentally unsuitable. Once the algorithm is effective at mimicking the results of the manual path studies and identifying other suitable paths, which can be verified manually during testing, then the AI optimizes paths for multiple sites. Optimization involves initially training the AI to identify suitable paths concurrently for each site (and indicating where no suitable path is available). Once this performance has been grasped by the AI, the final step is to teach it to favor paths that reduce cost by combining, where possible, repeater stations.

Figure 6:
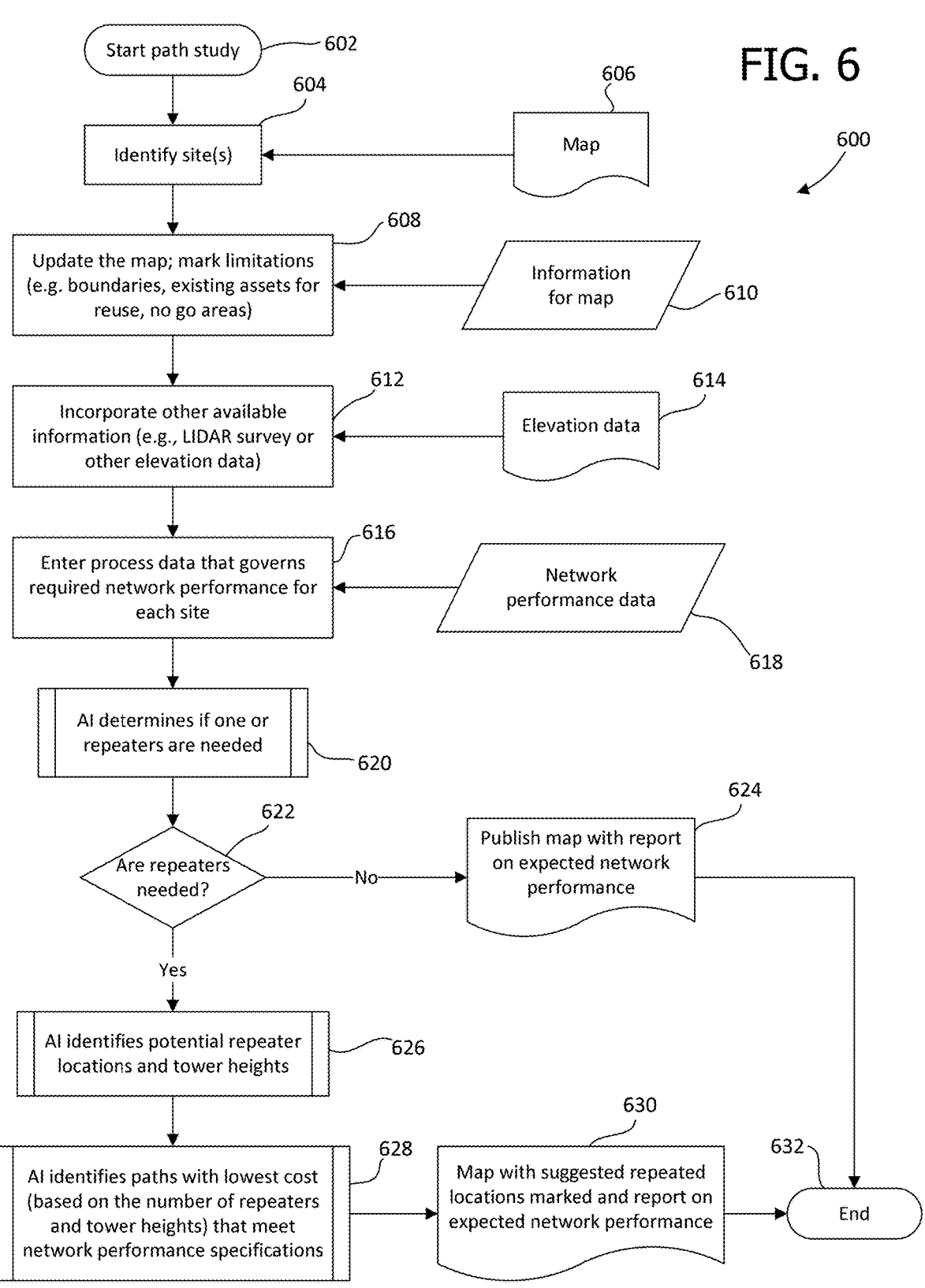
FIG. 6 is a flow diagram illustrating an example process for generating a path study according to an embodiment.

FIG. 6 is a flow diagram illustrating an example process for generating a path study according to an embodiment. An example process 600 begins a path study embodying aspects of the present disclosure at 602. At 604, prospective sites for locating antennas 122 are identified from a map input 606. The map input 606 indicates various obstructions to transmission, such as trees or other vegetation, traffic, buildings, mountains, etc. At 608, the process updates the map and marks limitations (e.g., boundaries, existing assets for reuse, no-go areas, future building sites, limited or restricted access to land) based on additional information 610. At 612, other available information, such as LIDAR survey or other elevation data 614, is incorporated. At 616, the process 600 includes entering network performance data 618 that governs the required network performance for each site. It is to be understood that ML_Device 128 retrieves map 606, information 610 for the map, elevation data 614, and network performance data 618 from site data 126. The ML_Device 128 executes an AI subprocess 620 to determine if one or repeaters are needed. If not, as determined at 622 a map of the sites is published at 624, including a report on expected network performance. On the other hand, if repeaters are needed as determined at 622, ML_Device 128 executes an AI subprocess 626 for identifying potential repeater locations and tower heights. The ML_Device 128 then executes an AI subprocess 628 to identify paths having the lowest cost (based on the number of repeaters and tower heights) that meet network performance specifications. At 630, a map of the sites with suggested repeated locations marked is published, including a report on expected network performance. In the illustrated embodiment, process 600 ends at 632.

The SCADA system 102, including RTU 106, is well-suited for use in oil and gas environments, such as upstream oil and gas production, including gas well heads, oil extraction, and multi-well shale gas well pads. Additional customer use cases in the oil and gas segment include energy optimization, asset age prolongation, production optimization, and 'cradle-to-grave' operation with the same equipment to allow changes in extraction technique using the same control system equipment. Oil and gas segment use cases also include: management of control system and IT equipment, including security configurations, and deployment of trusted application content; and midstream gas transportation including compressor stations and multiple geographies. The functions of RTU 106 in an oil and gas application, for example, include: tank monitoring and automation; well test automation; Emergency Shut-Down (ESD) at well heads; well production and optimization; and measurement.

In an oil and gas environment, for example, substation 114 is located at a well site to gather data about various aspects of the well site for monitoring and tracking purposes. The substation 114, which acts as a control unit, includes RTU 106 for collecting data on pump motor operation (e.g., motor speed and load). A variable speed drive motor controller, for example, generates this motor data. The RTU 106 also collects measurements from various wireless and wired field sensors (i.e., peripherals 112) around the well site. These field sensors include a proximity sensor mounted near the crank arm of a rod pump assembly and a load cell mounted between the bridle and polished rod of the rod pump assembly. From this data, RTU 106 can determine the tension or load (vertical axis) on the rod versus the displacement (horizontal axis) of the rod per stroke or pump cycle (i.e., upward and downward movement). Other data collected by RTU 106 from the field sensors may include fluid flow rate, temperature, pressure, and the like.

In an embodiment, RTU 106 is also well-suited for use in the water/wastewater segment, including critical infrastructure pumping stations. Additional customer use cases in the water and wastewater segment include energy optimization for critical infrastructure pumping stations and management of control system and IT equipment including security configurations, and deployment of trusted application content. Examples of water and wastewater functions of RTU 106 include: pump/lift stations; leakage detection; equipment monitoring and control; water quality monitoring; irrigation; managing a District Metering Area (DMA) and/or Pressure Monitoring Area (PMS); and monitoring flow, level, pressure, temperature, etc.

Another use case for the RTU 106 embodying aspects of the present disclosure involves electrical applications such as wind, solar, transformer stations, etc. Diversification of energy production resources require utility operators to manage a much wider portfolio of assets. Moreover, assets such as wind turbines and solar cells are often located in harsh, remote environments. In an embodiment, RTU 106 monitors active and reactive power, phase voltage, connection status of switches, and the like.

Yet another use case for the RTU 106 embodying aspects of the present disclosure involves autonomous, remotely located assets 104, including critical infrastructure assets, where high control system, monitoring, and reporting availability as well as data analytics associated with control systems, asset performance, and custom application features are requested.

In operation, a method for performing path studies for remote telemetry applications comprises, in response to receiving a request to perform a path study for a given area, requesting and retrieving maps, property boundary information, satellite imagery, GPS coordinates, restrictions, and/or other relevant information (e.g., obstruction information) for performing the path study using at least one device associated with a remote telemetry application. The method also includes analyzing the retrieved information using the at least one device associated with the remote telemetry application to determine if any more information is required to perform the path study. In response to determining more information is required to perform the path study, the method requests and retrieves the required information until there is no more information required to perform the path study. In response to determining no more information is required to perform the path study, the method includes processing the retrieved information to calculate a series of paths and suggest one or more sites in the given area suitable for installing antennas (e.g., radio and cell antennas) and other necessary equipment (e.g., infrastructure) for the remote telemetry application. The one or more sites are suggested based at least in part on an analysis of the calculated paths, indicated or learned obstructions, or no-go areas, and indicated or learned communication needs associated with the remote telemetry application.

The information includes at least one of: make(s) and model(s) of the antennas, configuration information associated with the antennas, potential installation options, costs associated with installing and maintaining the antennas, and infrastructure in place or needed for powering the antennas are further identified and provided during the path study. According to an embodiment, the retrieved information also includes both manual input data (received from a person via, for example, an interface on a web-based application) and automatically retrieved input data. The one or more suggested sites are identified and ranked based on at least one of: indicated or learned customer preferences, cost, ease or difficulty of installation. Instead of or in addition to the above, the one or more suggested sites are suggested based at least in part on user entered or specified criteria such as projected signal strength, distance from process(es), etc.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor(s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. A method of managing remote telemetry communications in a process control system, the process control system comprising a Supervisory Control and Data Acquisition (SCADA) server configured to monitor telemetry data from a remote industrial asset and provide supervisory control via a private network, the private network comprising a plurality of data radios, the method comprising:

receiving input representative of network performance requirements for the private network;

retrieving site data from a site database in response to a request to perform a path study, wherein the site data stored in the site database comprises information relating to a designated area for establishing remote telemetry communications via the private network, and wherein the plurality of data radios of the private network comprises a data radio associated with the remote industrial asset and an access point associated with the SCADA server;

executing machine learning to perform the path study for establishing the private network between the access point and the data radio associated with the remote industrial asset within the designated area, wherein the machine learning includes:

executing a predictive model based on the retrieved site data to identify one or more potential communications paths between the access point and the data radio associated with the remote industrial asset, wherein the one or more potential communications paths each specifies at least one antenna parameter of the plurality of data radios of the private network; and selecting an optimal communication path from the one or more potential communications paths based at least in part on the network performance requirements of the private network and predicted signal quality along the potential communications paths, wherein the selected optimal communications path includes a location of at least one antenna within the designated area; and establishing remote telemetry communications on the private network via the antenna between the access point and the data radio associated with the remote industrial asset within the designated area along the optimal communication path.

2. The method of claim 1, wherein the at least one antenna parameter comprises at least one of the following; a location within the designated area, a tower height, a radiation pattern, power, gain, and directivity.

3. The method of claim 1, wherein the site data comprises at least one of the following: a map; property boundary information; satellite imagery; Global Positioning System (GPS) coordinates; legal restrictions; physical restrictions; and obstruction information.

4. The method of claim 1, wherein the plurality of data radios comprises one or more repeaters between the access point and the data radio associated with the remote industrial asset.

5. The method of claim 4, wherein selecting the optimal communication path comprises balancing a cost associated with the one or more repeaters along the potential communications paths and a cost associated with the specified antenna parameter for each antenna along the potential communications paths while meeting the network performance requirements of the private network.

6. The method of claim 5, wherein the specified antenna parameter comprises a tower height, and wherein the balancing is based on a number of the repeaters along the potential communication paths and the tower height of each antenna along the potential communication paths.

7. The method of claim 5, wherein the cost associated with the specified antenna parameter is a function of one or more of the following for each antenna along the potential communication paths: make and model, configuration information, installation options, installation and maintenance, existing infrastructure, needed infrastructure, and power requirements.

8. The method of claim 1, wherein the machine learning further includes executing the predictive model based on the retrieved site data to identify one or more no-go areas in the designated area between the access point and the data radio associated with the remote industrial asset.

9. The method of claim 1, further comprising:
analyzing the retrieved site data to determine whether the information relating to the designated area is sufficient for performing the path study; and
in response to determining additional information relating to the designated area is required to perform the path study, requesting and retrieving the additional information until the information relating to the designated area is sufficient for performing the path study.

10. The method of claim 1, further comprising training the predictive model, wherein training the predictive model comprises teaching artificial intelligence (AI) to calculate signal quality at the access point following one or more preset paths from a training set.

11. The method of claim 10, wherein the training set comprises a catalog of previous manual path studies and wherein training the predictive model comprises adjusting the predictive model until the potential communications paths identified by the predictive model based on the training set match the manual path studies.

12. The method of claim 1, wherein selecting the optimal communication path comprises ranking the potential communications paths based on at least one of the following: indicated customer preferences, learned customer preferences, cost, and ease or difficulty of installation.

13. The method of claim 1, wherein the industrial assets comprise one or more of the following: a remote terminal unit (RTU) device, a programmable logic controller (PLC), and a peripheral device.

14. An automation system comprising:
a private network having a plurality of data radios, each of the data radios having an antenna coupled thereto;
a remote industrial asset coupled to the private network;
a Supervisory Control and Data Acquisition (SCADA) server configured to monitor telemetry data from the remote industrial asset and provide supervisory control via the private network, wherein the plurality of data radios of the private network comprises a data radio associated with the remote industrial asset and an access point associated with the SCADA server;
a site database storing information relating to a designated area for establishing remote telemetry communications via the private network;
a path study processor coupled to the site database, the path study processor receiving input representative of network performance requirements for the private network and retrieving site data from the site database in response to a request to perform a path study; and
a memory device storing computer-executable instructions that, when executed by the path study processor, configure the path study processor for:
executing machine learning to perform the path study for establishing the private network between the access point and the data radio associated with the remote industrial asset within the designated area, wherein the machine learning includes:
executing a predictive model based on the retrieved site data to identify one or more potential communications paths between the access point and the data radio associated with the remote industrial asset, wherein the one or more potential communications paths each specifies at least one antenna parameter of the plurality of data radios of the private network; and
selecting an optimal communication path from the one or more potential communications paths based at least in part on the network performance requirements of the private network and predicted signal quality along the potential communications paths, wherein the selected optimal communications path includes a location of at least one antenna within the designated area; and
establishing remote telemetry communications on the private network via the antenna between the access point and the data radio associated with the remote industrial asset within the designated area along the optimal communication path.

15. The system of claim 14, wherein the at least one antenna parameter comprises at least one of the following; a location within the designated area, a tower height, a radiation pattern, power, gain, and directivity.

16. The system of claim 14, wherein the site data comprises at least one of the following: a map; property boundary information; satellite imagery; Global Positioning System (GPS) coordinates; legal restrictions; physical restrictions; and obstruction information.

17. The system of claim 14, wherein the plurality of data radios comprises one or more repeaters between the access point and the data radio associated with the remote industrial asset and selecting the optimal communication path comprises balancing a cost associated with the one or more repeaters along the potential communications paths and a cost associated with the specified antenna parameter for each antenna along the potential communications paths while meeting the network performance requirements of the private network.

18. The system of claim 17, wherein the specified antenna parameter comprises a tower height, and wherein the balancing is based on a number of the repeaters along the potential communication paths and the tower height of each antenna along the potential communication paths.

19. The system of claim 14, wherein the machine learning further includes executing the predictive model based on the retrieved site data to identify one or more no-go areas in the designated area between the access point and the data radio associated with the remote industrial asset.

20. The system of claim 14, wherein the computer-executable instructions stored in the memory device, when executed by the path study processor, further configure the path study processor for teaching artificial intelligence (AI) to calculate signal quality at the access point following one or more preset paths from a training set to train the machine learning.

21. The system of claim 20, wherein the training set comprises a catalog of previous manual path studies and wherein the computer-executable instructions stored in the memory device, when executed by the path study processor, further configure the path study processor for adjusting the predictive model until the potential communications paths identified by the predictive model based on the training set match the manual path studies.

22. The system of claim 14, wherein the path study processor comprises at least one of the following: one of the data radios, a cell modem, a remote terminal unit (RTU) device, a programmable logic controller (PLC), and an edge computing device.

* * * * *